United States Patent
Lee et al.

(10) Patent No.: US 9,601,777 B2
(45) Date of Patent: Mar. 21, 2017

(54) ANODE FOR LITHIUM SECONDARY BATTERY, METHOD FOR MANUFACTURING SAME, AND LITHIUM SECONDARY BATTERY INCLUDING SAME

(71) Applicant: LG Chem, Ltd., Seoul (KR)

(72) Inventors: Su-Min Lee, Daejeon (KR); Eun-Kyung Kim, Daejeon (KR); Je-Young Kim, Daejeon (KR); Sang-Wook Woo, Daejeon (KR); Hyun-Wook Kim, Daejeon (KR); Sun-Young Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/761,704

(22) PCT Filed: Feb. 7, 2014

(86) PCT No.: PCT/KR2014/001054
§ 371 (c)(1),
(2) Date: Jul. 17, 2015

(87) PCT Pub. No.: WO2014/168327
PCT Pub. Date: Oct. 16, 2014

(65) Prior Publication Data
US 2015/0364766 A1   Dec. 17, 2015

(30) Foreign Application Priority Data

Apr. 8, 2013   (KR) ................. 10-2013-0038169

(51) Int. Cl.
*H01M 4/04*       (2006.01)
*H01M 4/587*      (2010.01)
(Continued)

(52) U.S. Cl.
CPC .......... *H01M 4/624* (2013.01); *H01M 4/0404* (2013.01); *H01M 4/133* (2013.01);
(Continued)

(58) Field of Classification Search
CPC .. H01M 4/0404; H01M 4/133; H01M 4/1393; H01M 4/587; H01M 4/622;
(Continued)

(56) References Cited

U.S. PATENT DOCUMENTS

| | | | |
|---|---|---|---|
| 2009/0117020 A1 | 5/2009 | Manthiram et al. | |
| 2009/0305135 A1* | 12/2009 | Shi ........................ | B82Y 30/00 429/217 |
| 2010/0055572 A1* | 3/2010 | Park ....................... | B82Y 30/00 429/232 |
| 2010/0308277 A1 | 12/2010 | Grupp et al. | |
| 2011/0229759 A1 | 9/2011 | Yazami et al. | |
| 2014/0315081 A1 | 10/2014 | Zhang et al. | |

FOREIGN PATENT DOCUMENTS

| CN | 102522563 A | 6/2012 |
|---|---|---|
| JP | 2007035472 A | 2/2007 |

(Continued)

OTHER PUBLICATIONS

Extended Search Report from European Application No. 14782986.5, dated Mar. 10, 2016.

(Continued)

*Primary Examiner* — Brittany Raymond
(74) *Attorney, Agent, or Firm* — Lerner, David, Littenberg, Krumholz & Mentlik, LLP

(57) ABSTRACT

Disclosed is an anode for a lithium secondary battery, including a carbon-based anode active material, a binder and a conductive polymer, wherein the conductive polymer is in fiber form. A lithium secondary battery including the anode is also provided. As the anode for a lithium secondary battery includes a conductive polymer in fiber form, poor conductivity, which is a problem with a carbon-based anode active material, can be overcome, and the anode can be easily manufactured.

7 Claims, 3 Drawing Sheets

(51) Int. Cl.
  *H01M 4/62* (2006.01)
  *H01M 10/0525* (2010.01)
  *H01M 10/052* (2010.01)
  *H01M 4/133* (2010.01)
  *H01M 4/1393* (2010.01)
  *H01M 4/02* (2006.01)

(52) U.S. Cl.
  CPC ......... *H01M 4/1393* (2013.01); *H01M 4/587* (2013.01); *H01M 4/622* (2013.01); *H01M 10/052* (2013.01); *H01M 10/0525* (2013.01); *H01M 2004/027* (2013.01); *Y02P 70/54* (2015.11)

(58) Field of Classification Search
  CPC ........... H01M 4/624; H01M 2004/027; H01M 10/0525; Y02P 70/54; Y02E 60/122
  See application file for complete search history.

(56) References Cited

FOREIGN PATENT DOCUMENTS

| | | |
|---|---|---|
| JP | 2008016381 A | 1/2008 |
| JP | 2011-100594 A | 5/2011 |
| JP | 2013196910 A | 9/2013 |
| KR | 2010-0103426 A | 9/2010 |
| KR | 2012-0129983 A | 4/2014 |

OTHER PUBLICATIONS

International Search Report for Application No. PCT/KR2014/001054 dated May 23, 2014.

\* cited by examiner anode active material + conductive polymer (PEDOT:PSS) →

ANODE FOR LITHIUM SECONDARY BATTERY, METHOD FOR MANUFACTURING SAME, AND LITHIUM SECONDARY BATTERY INCLUDING SAME

CROSS-REFERENCE TO RELATED APPLICATION

This application is a national phase entry under 35 U.S.C. §371 of International Application No. PCT/KR2014/001054, filed Feb. 7, 2014, which claims priority to Korean Patent Application No. 10-2013-0038169, filed Apr. 8, 2013, the disclosures of which are incorporated herein by reference.

TECHNICAL FIELD

The present invention relates to an anode for a lithium secondary battery, a method of manufacturing the same, and a lithium secondary battery including the same. More particularly, the present invention relates to an anode containing a conductive polymer for a lithium secondary battery, a method of manufacturing the same, and a lithium secondary battery including the same.

BACKGROUND ART

Typically, a lithium secondary battery includes an anode formed of a carbon material or a lithium metal alloy, a cathode formed of a lithium metal oxide, and an electrolyte comprising a lithium salt dissolved in an organic solvent. In particular, lithium metal has been initially utilized as an anode active material for an anode for a lithium secondary battery. However, lithium is problematic because of low reversibility and safety. Currently useful as an anode active material for a lithium secondary battery is a carbon material. A carbon material has low capacity compared to lithium metal, but is advantageous in terms of low volume change, high reversibility and favorable price.

However, such a carbon-based anode active material has limited conductivity, and may increase electrode resistance due to the formation of an empty space in a boundary portion between active materials upon electrode fabrication.

Accordingly, thorough research is ongoing into improvements in low conductivity. For example, Korean Patent Application Publication No. 2012-0129983 discloses an anode material for increasing conductivity using carbon black, but is disadvantageous because of complicated preparation processes and insufficient conductivity.

DISCLOSURE

Technical Problem

The present invention has been made keeping in mind the above problems in the related art, and an object of the present invention is to provide an anode for a lithium secondary battery, which may employ a conductive polymer, thus solving poor conductivity problems with a carbon-based anode active material, and facilitating the fabrication of an anode.

Technical Solution

In order to accomplish the above object, the present invention provides an anode for a lithium secondary battery, comprising a carbon-based anode active material, a binder and a conductive polymer, wherein the conductive polymer is in fiber form.

In addition, the present invention provides a method of manufacturing an anode for a lithium secondary battery, comprising (A) dispersing a carbon-based anode active material and a conductive polymer in a binder solution, thus preparing a slurry; (B) applying the slurry on the surface of a current collector to be formed with an anode active material layer; and (C) drying the current collector coated in (B), wherein the conductive polymer is in fiber form.

Advantageous Effects

According to the present invention, an anode for a lithium secondary battery includes poly-3,4-ethylenedioxythiophene/polystyrenesulfonate (PEDOT/PSS) as a conductive polymer, thus preventing a reduction in conductivity that is regarded as problematic in a carbon-based anode active material, and easily controlling the fabrication of an anode.

BEST MODE

Figure 1:
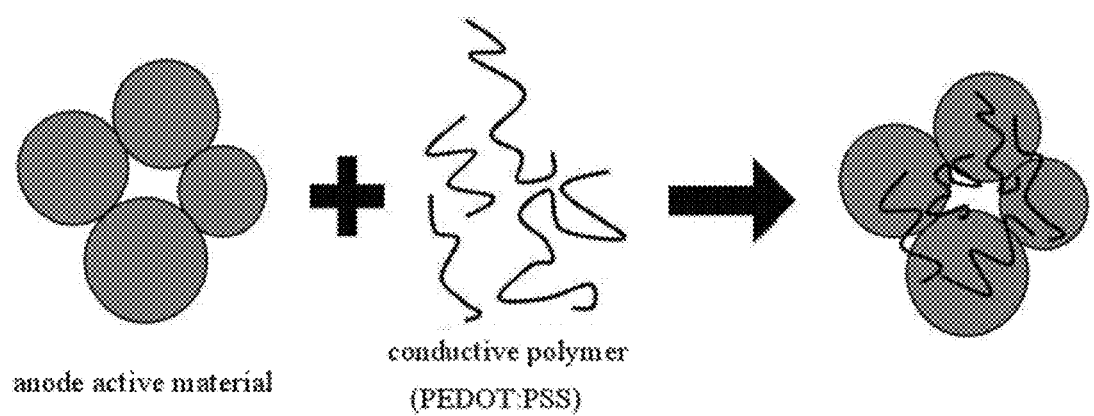
FIG. 1 is a schematic view illustrating a manufacturing process according to the present invention.

Hereinafter, a detailed description will be given of the present invention.

According to the present invention, an anode for a lithium secondary battery includes a carbon-based anode active material, a binder and a conductive polymer. As such, the conductive polymer is in fiber form.

According to the present invention, the carbon-based anode active material may include a typically useful carbon-based anode active material. The carbon-based anode active material preferably includes a carbon material. The carbon material may include low crystalline carbon and high crystalline carbon. Examples of the low crystalline carbon may include soft carbon and hard carbon, and examples of the high crystalline carbon may include high-temperature calcined carbon, such as natural graphite, Kish graphite, pyrolytic carbon, mesophase pitch based carbon fiber, mesocarbon microbeads, mesophase pitches, and petroleum or coal tar pitch derived cokes.

In the present invention, the amount of the carbon-based anode active material is not particularly limited so long as it falls in a typical range, but may be set to 20~95 wt % based on the total weight of the anode. When the amount of the carbon-based anode active material satisfies the above range, conductivity of the battery may become superior.

In the present invention, the binder may include a typically useful aqueous binder. The binder usable in the present invention may include any one or a mixture of two or more selected from the group consisting of styrene-butadiene rubber (SBR), nitrile-butadiene rubber, methyl (meth)acrylate-butadiene rubber, chloroprene rubber, carboxy-modified styrene-butadiene rubber, carboxymethylcellulose (CMC), and modified polyorganosiloxane polymers. Preferably useful is styrene-butadiene rubber.

Although the amount of the binder is not particularly limited so long as it falls in a typical range, the binder is contained in an amount of the remainder such that the total weight of the anode is 100 wt %, and its amount may be adjusted depending on the amounts of other components.

The conductive polymer according to the present invention may be in fiber form. Particularly useful as the conductive polymer in fiber form is PEDOT/PSS. The PEDOT/PSS is configured such that a thiophene structure has an ethylenedioxy group in a ring shape, and has superior stability for air or heat. Furthermore, such a conductive polymer is light weight compared to conventional anode materials, thus reducing the weight of the battery.

In the present invention, the conductive polymer is contained in an amount of 0.1~3 wt %, preferably 0.5~2 wt % and more preferably 0.8~1.5 wt %, based on solid content of the anode. When the amount of the conductive polymer satisfies the above range, conductivity may be prevented from decreasing, and formation of the anode may be easily controlled.

According to the present invention, a method of manufacturing the anode is not particularly limited, and may include typical processes known in the art, including applying an electrode slurry comprising an anode active material, a binder and a conductive polymer on a current collector and drying it. Further, a dispersant or a surfactant may be used, as necessary.

According to the present invention, a lithium secondary battery includes an anode comprising a carbon-based anode active material for a non-carbon-based lithium secondary battery, a cathode comprising a cathode active material, and an electrolyte.

In the present invention, the cathode active material preferably includes a lithium-containing transition metal oxide. For example, useful is any one or a mixture of two or more selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0\leq y<1$), $Li(Ni_aCo_bMn_c)O_4$ ($0<a<2$, $0<b<2$, $0<c<2$, $a+b+c=2$), $LiMn_{2-z}Ni_zO_4$ ($0<z<2$), $LiMn_{2-z}Co_zO_4$ ($0<z<2$), $LiCoPO_4$, and $LiFePO_4$. In addition to these oxides, sulfides, selenides and halides may be used.

As for an electrolyte solution used in the present invention, a lithium salt, which may be contained as the electrolyte, may be used without particular limitation so long as it is typically useful for an electrolyte solution for a lithium secondary battery. The anion of the lithium salt may include, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SRF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The lithium secondary battery according to the present invention may be utilized for a battery cell as a power source of a small device such as a mobile phone, and also may be employed as a unit cell for a medium or large battery module including a plurality of battery cells. Examples of the applicable medium and large devices may include a power tool; an electric vehicle including an electric vehicle (EV), a hybrid electric vehicle (HEV) and a plug-in hybrid electric vehicle (PHEV); an electric motorcycle including an e-bike and e-scooter; an electric golf cart; an electric truck; an electric commercial vehicle; and a power storage system.

A better understanding of the present invention may be obtained via the following examples that are set forth to illustrate, but are not to be construed as limiting the present invention. The scope of the present invention is described in the appended claims, and includes all modifications within ranges and meanings equivalent to the claims. Unless otherwise stated, "%" and "part" showing the amounts in the following examples and comparative examples are based on mass.

Mode for Invention

EXAMPLE

Manufacture of Anode

An anode mixture was prepared in a composition as shown in Table 1 below using natural graphite as a carbon-based anode active material, styrene-butadiene rubber as a binder, and PEDOT/PSS as a conductive polymer. Then, the anode mixture was added to N-methylpyrrolidone to prepare an anode active material slurry, which was then applied on a copper foil and dried at about 130° C. for 2 hr, thus manufacturing an anode.

TABLE 1

|  | Natural graphite (wt %) | SBR (wt %) | PEDOT/PSS (wt %) |
| --- | --- | --- | --- |
| Synthesis Ex. 1 | 93 | 6 | 1 |
| Synthesis Ex. 2 | 92 | 5 | 0 |

PEDOT/PSS: Baytron P

Surface resistance of the anode manufactured in the composition of Synthesis Examples 1 and 2 was measured using a surface resistance meter (a 4-point probe). The results are shown in Table 2 below.

TABLE 2

| Anode | Surface resistance ($m\Omega/m^2$) |
| --- | --- |
| Synthesis Ex. 1 | 46.9 |
| Synthesis Ex. 2 | 16.1 |

Manufacture of Half-Cell Battery

Example 1

A coin type half-cell battery (2016 R-type half cell) was manufactured in a helium-filled glove box using the anode of Synthesis Example 1, a lithium counter electrode, a microporous polyethylene separator, and an electrolyte. The electrolyte was obtained by dissolving 1 M $LiPF_6$ in a solvent mixture of ethylene carbonate and dimethyl carbonate at a volume ratio of 50:50.

Comparative Example 1

A coin type half-cell battery (2016 R-type half cell) was manufactured in the same manner as in Example 1, with the exception that the anode of Synthesis Example 2 was used.

Test Example 1. Lifetime and Efficiency of Battery

The half-cell battery of each of Example 1 and Comparative Example 1 was charged/discharged at 0.5 C in 50 cycles between 0 V and 1.5 V, and Coulombic efficiency and changes in charge capacity were measured. The results are shown in FIGS. 2(*a*) and 2(*b*).

Figure 2:
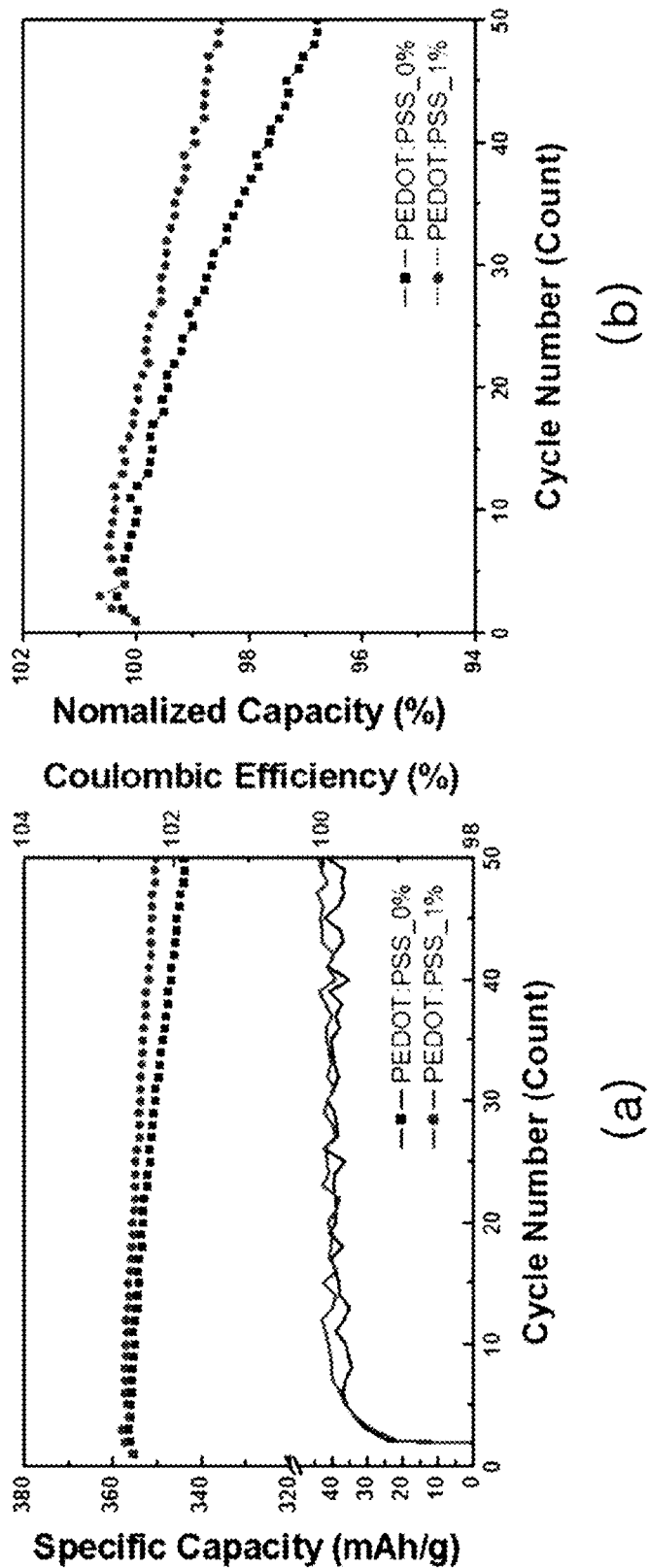
FIG. 2 is of graphs illustrating the lifetime and efficiency properties of batteries of Example 1 and Comparative Example 1.

As illustrated in FIG. 2(*a*), the battery of Example 1 exhibited stably high Coulombic efficiency, compared to the battery of Comparative Example 1.

As illustrated in FIG. 2(b), the battery of Example 1 maintained 98% or more of the initial capacity even after 50 cycles, but the charge capacity of the battery of Comparative Example 1 was decreased to 97% or less. Ultimately, the lifetime of the battery of Example 1 was increased.

Based on the above measurement results, the lithium ion battery according to the present invention had long lifetime compared to conventional techniques, and could be subjected to quick charging at high charge-discharge rates.

Test Example 2. Resistance of Battery at High Rate

The half-cell battery of each of Example 1 and Comparative Example 1 was subjected to high-rate discharge at 5 C between 0 V and 1.5 V, and the internal resistance thereof was measured. The results are shown in FIG. 3.

Figure 3:
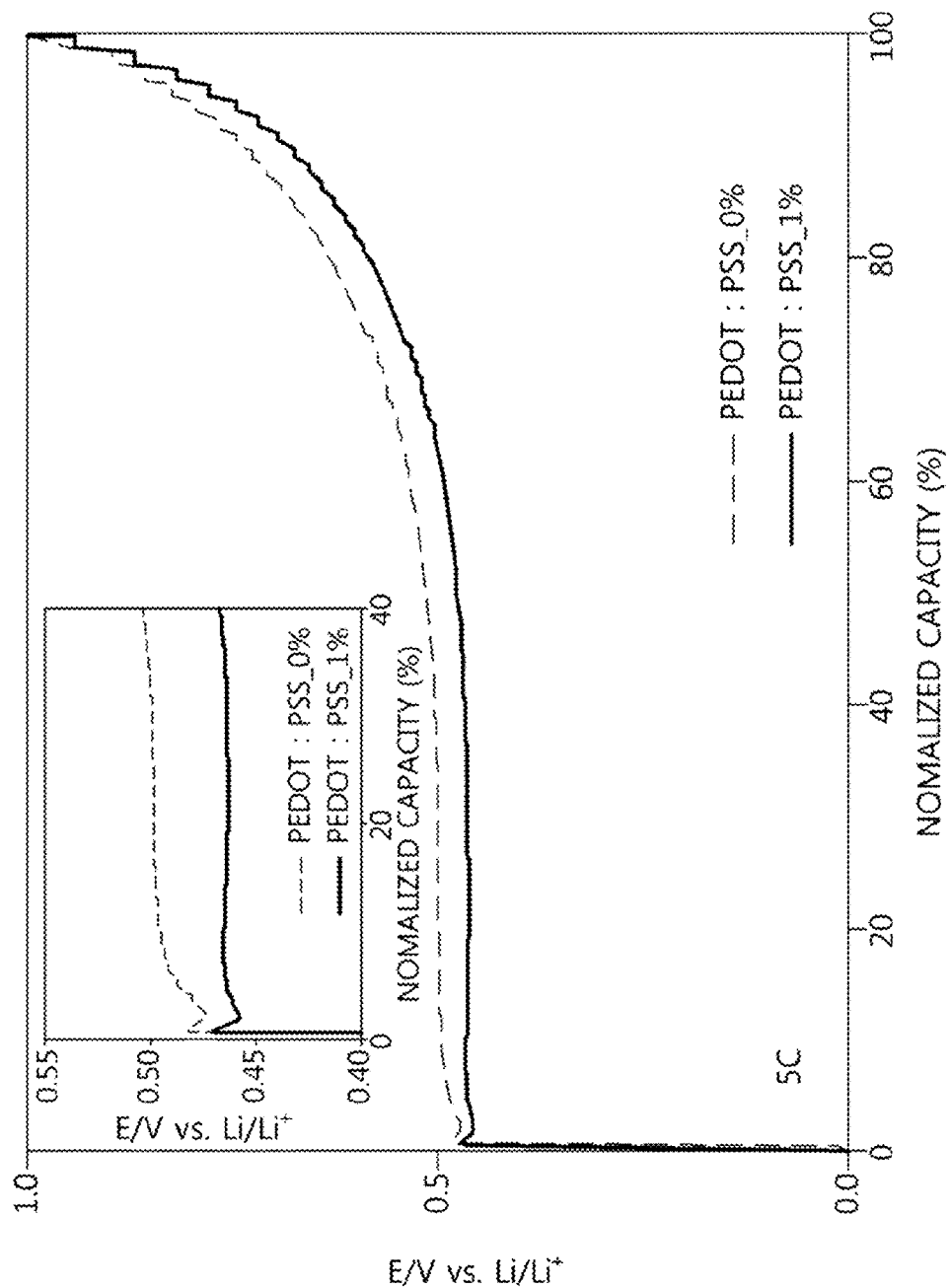
FIG. 3 is a graph illustrating the resistance properties of batteries of Example 1 and Comparative Example 1.

As illustrated in FIG. 3, the battery of Example 1 had resistance properties lower by at least about 8 than the battery of Comparative Example 1.

The invention claimed is:

1. An anode for a lithium secondary battery, comprising a carbon-based anode active material, a binder and a conductive polymer, wherein the conductive polymer is in fiber form, wherein the conductive polymer is poly-3,4-ethylenedioxythiophene/polystyrenesulfonate (PEDOT/PSS), and wherein the conductive polymer is contained in an amount of 0.8 to 1.5 wt % based on a solid content of the anode.

2. The anode of claim 1, wherein the binder is any one or a mixture of two or more selected from the group consisting of styrene-butadiene rubber, nitrile-butadiene rubber, methyl (meth)acrylate-butadiene rubber, chloroprene rubber, carboxy-modified styrene-butadiene rubber, carboxymethylcellulose (CMC), and modified polyorganosiloxane polymers.

3. The anode of claim 1, wherein the carbon-based anode active material is any one or a mixture of two or more selected from the group consisting of soft carbon, hard carbon, natural graphite, Kish graphite, pyrolytic carbon, mesophase pitch based carbon fiber, meso-carbon microbeads, mesophase pitches, and petroleum or coal tar pitch derived cokes.

4. A method of manufacturing the anode of claim 1, comprising:
   (A) dispersing a carbon-based anode active material and a conductive polymer in a binder solution, thus preparing a slurry;
   (B) applying the slurry on a surface of a current collector to be formed with an anode active material layer; and
   (C) drying the current collector coated in (B),
   wherein the conductive polymer is poly-3,4-ethylenedioxythiophene/polystyrenesulfonate (PEDOT/PSS), and wherein the conductive polymer is contained in an amount of 0.8 to 1.5 wt % based on a solid content of the anode.

5. A lithium secondary battery comprising a cathode, an anode and an electrolyte, wherein the anode is the anode of claim 1.

6. A lithium secondary battery comprising a cathode, an anode and an electrolyte, wherein the anode is the anode of claim 2.

7. A lithium secondary battery comprising a cathode, an anode and an electrolyte, wherein the anode is the anode of claim 3.

* * * * *